United States Patent
Lesartre et al.

(10) Patent No.: US 10,474,389 B2
(45) Date of Patent: Nov. 12, 2019

(54) WRITE TRACKING FOR MEMORIES

(71) Applicant: HEWLETT PACKARD ENTERPRISE DEVELOPMENT LP, Houston, TX (US)

(72) Inventors: Gregg B. Lesartre, Ft. Collins, CO (US); Brian S. Birk, Corvallis, OR (US); Joseph F. Orth, Fort Collins, CO (US); Harvey Ray, Ft. Collins, CO (US); Craig Warner, Plano, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/201,981

(22) Filed: Jul. 5, 2016

(65) Prior Publication Data
US 2018/0011660 A1   Jan. 11, 2018

(51) Int. Cl.
*G06F 3/06* (2006.01)

(52) U.S. Cl.
CPC ............ *G06F 3/0656* (2013.01); *G06F 3/061* (2013.01); *G06F 3/0673* (2013.01); *G06F 3/0679* (2013.01)

(58) Field of Classification Search
CPC ...... G06F 3/0656; G06F 3/061; G06F 3/0653; G06F 3/0673
See application file for complete search history.

(56) References Cited

U.S. PATENT DOCUMENTS

| | | | | |
|---|---|---|---|---|
| 5,539,890 A * | 7/1996 | Rahman | ............... | G06F 9/4403 710/262 |
| 5,745,732 A * | 4/1998 | Cherukuri | ........... | G06F 12/0835 710/20 |
| 5,948,081 A * | 9/1999 | Foster | ................. | G06F 13/1642 710/25 |
| 5,987,555 A * | 11/1999 | Alzien | ............... | G06F 13/4031 370/402 |
| 6,667,926 B1 * | 12/2003 | Chen | .................... | G06F 13/161 365/221 |
| 6,704,817 B1 * | 3/2004 | Steinman | ............ | G06F 13/4059 710/100 |
| 7,469,316 B2 * | 12/2008 | Dodd | ................. | G06F 12/0215 711/100 |
| 7,680,992 B1 | 3/2010 | Van Dyke et al. | | |
| 8,004,884 B2 * | 8/2011 | Franceschini | ....... | G06F 13/1642 365/163 |
| 2002/0112133 A1 * | 8/2002 | Gagne | .................. | G06F 3/0613 711/150 |

(Continued)

OTHER PUBLICATIONS

Pingguo Li et al., "AOS: Adaptive Out-of-order Scheduling for Write-caused Interference Reduction in Solid State Disks," IMECS 2015, vol. 1, Mar. 18-20, 2015, Hong Kong, pp. 1-6.

*Primary Examiner* — Ramon A. Mercado
(74) *Attorney, Agent, or Firm* — Hewlett Packard Enterprise Patent Department (57) ABSTRACT

In various examples, device comprises a memory and a memory controller. The memory controller comprises a write tracking buffer. The memory controller to: receive a write request bound for the memory, store an entry associated with the write request in the write tracking buffer, and determine an access pattern of the memory. The access pattern indicates a high or a low write bandwidth of the memory. The memory controller to execute the write request bound for the memory based on the determined memory access pattern, complete execution of the write request, and responsive to completing execution of the write request, free the entry associated with the write request from the write tracking buffer.

11 Claims, 10 Drawing Sheets

(56) References Cited

U.S. PATENT DOCUMENTS

| | | |
|---|---|---|
| 2007/0198768 A1 | 8/2007 | Kim et al. |
| 2011/0208933 A1* | 8/2011 | Selfin .................... G06F 11/108 711/162 |
| 2012/0179860 A1 | 7/2012 | Falanga et al. |
| 2013/0179614 A1 | 7/2013 | Ross et al. |
| 2014/0040550 A1* | 2/2014 | Nale .................... G06F 13/1694 711/118 |
| 2016/0139807 A1* | 5/2016 | Lesartre .................... G11C 5/04 711/154 |

* cited by examiner

WRITE TRACKING FOR MEMORIES

BACKGROUND

Computing devices may be coupled to memories. The memories may execute read and write operations.

BRIEF DESCRIPTION OF THE DRAWINGS

Certain examples are described in the following detailed description and in reference to the drawings, in which.

DETAILED DESCRIPTION

A computing device may comprise a processor, such as a central processing unit (CPU). The CPU may be coupled with a memory controller. The memory controller generates reads and writes to memory coupled with the memory controller. In some examples, the memory may comprise multiple subarrays or banks. Each bank may comprise a unit of the memory that can be independently accessed (i.e. written or read).

The memory controller may include a write tracking buffer for purposes of holding and scheduling write transactions bound for the controlled memory. A memory with a long characteristic write latency may utilize a larger write tracking buffer. Long write latencies also impact the latency of reads that need to use the same bank as an in-progress write. To alleviate the impact on read latency, the memory controller may support a capability to suspend an in-progress write in order to allow the read to execute without needing to wait for the full write latency. The memory controller may resume the write responsive to the memory completing the read.

The techniques described herein allow a memory controller to dynamically determine if better memory performance may be achieved by suspending writes to reduce read latencies, or by preventing reads from suspending writes. To determine whether or not writes may be suspended, the memory controller may determine a memory access pattern based on the current write bandwidth to the memory.

In the case of a high write bandwidth, the memory controller may mark a status of a bank being used by a write operation as "un-suspendable." If the memory controller receives a new read request that is associated with a bank having a write request marked as un-suspendable, the memory controller waits for the write to complete before issuing the read operation. That is, a bank marked as un-suspendable does not allow the suspension of any pending writes. In the case that the write tracking buffer is full, the write tracking buffer releases write entries associated with banks earlier and marks the banks as un-suspendable so that more new writes can be accepted into the write tracking buffer. The un-suspendable status of a bank disallows suspension of write requests for the bank for the remaining duration of a write associated with that particular bank.

Figure 1:
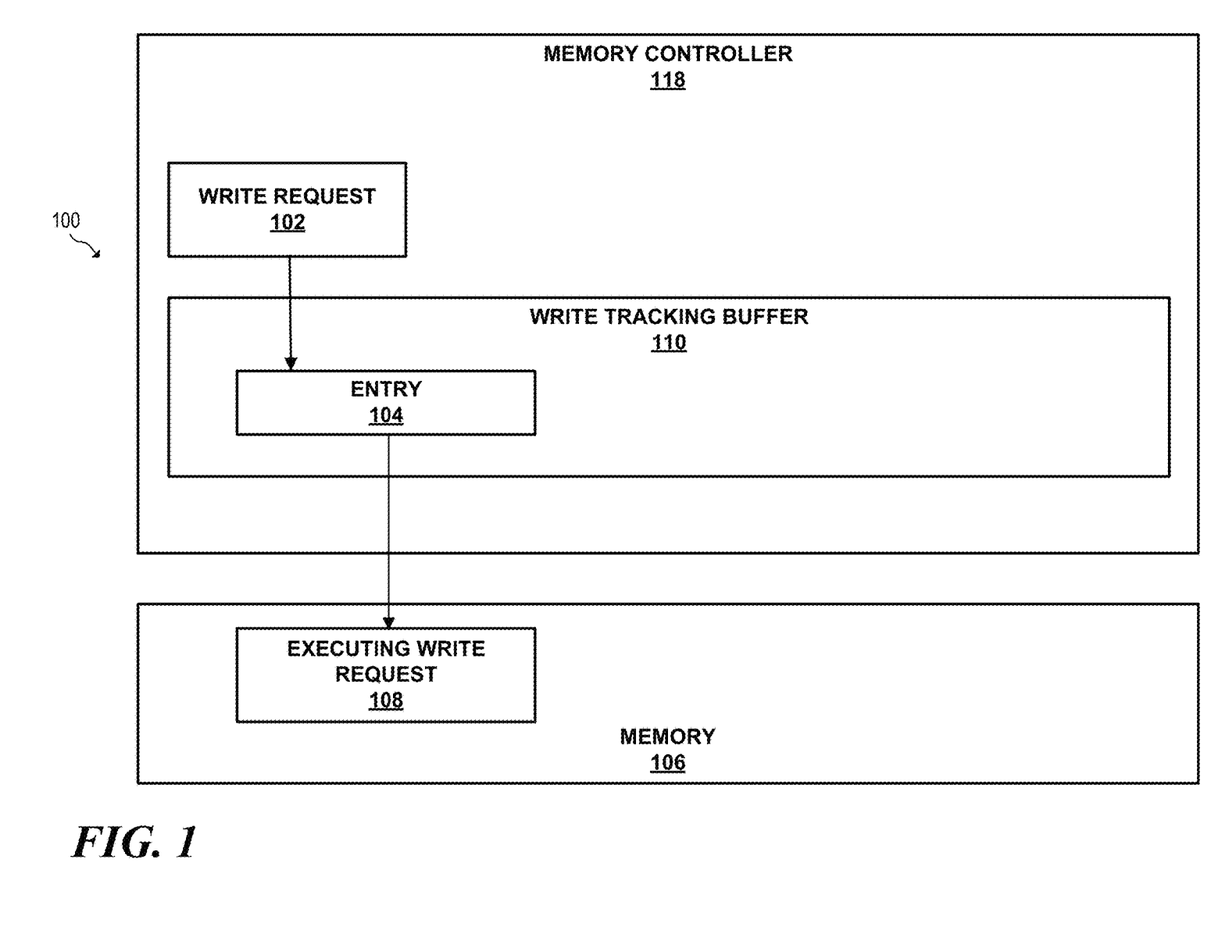
FIG. 1 is a conceptual diagram of an example computing system that may perform write tracking.

FIG. 1 is a conceptual diagram of an example computing system that may perform write tracking. Computing system 100 is illustrated in FIG. 1. Computing system 100 comprises a memory 106, a memory controller 118, and a write request 102.

In various examples, memory 106 may comprise one or more of dynamic memory, such as double data rate (DDR) random access memory (RAM), static RAM, graphics DDR RAM, (GDDR), high bandwidth memory (HBM), or Hybrid Memory Cube or the like. In some examples, memory 106 may comprise non-volatile memory such as: NAND flash memory, resistive ram (ReRam), phase change RAM (PCRAM), spin transfer torque memory (STTRAM), magneto resistive RAM, or the like. In various examples, memory 106 may comprise a die. The die may be mounted on a dynamic inline memory module, printed circuit board (PCB), a PCIe (Peripheral Component Interconnect Express) card, a drive enclosure, or the like. As will be described in greater detail herein, memory 106 may comprise a plurality of banks.

System 100 also comprises memory controller 118. In some examples, memory controller 118 may comprise a memory controller that is external to memory 106. In various examples, memory controller 118 may be coupled to at least one central processing unit (CPU). In some examples, memory controller 118 may comprise a memory controller that is on a same printed circuit with memory 106. In yet some other examples, memory controller 118 may be distributed and may comprise a plurality of discrete and/or integrated devices. In some examples, memory controller 118 may comprise a CPU memory controller.

Memory controller 118 comprises write tracking buffer 110. Write tracking buffer 110 may comprise logic and storage for write entries that are pending for memory 106. The write tracking logic of write tracking buffer 110 may comprise one or more of: a field programmable gate array (FPGA), fixed function logic, or an application-specific integrated circuit (ASIC). Memory controller 120 receives read and write requests, e.g. from a CPU or a memory controller. Memory controller 118 may be coupled, e.g. to a CPU, via memory interface, a PCIe interface, a fabric, or the like.

In the example of FIG. 1, memory controller 118 receives write request 102, which is bound for memory 106. Based on the received write request 102, memory controller 118 generates an associated entry in write tracking buffer 110, i.e. entry 104. Although write tracking buffer 110 is illustrated as storing a single entry 104 for the purpose of example, it should be understand that write tracking buffer 110 may store a plurality of entries. Each entry may comprise data that indicate the progress of the associated write. Once the write completes execution, memory controller 118 removes the associated write entry from write tracking buffer 110.

In some examples, memory controller 118 may allow a read request bound for a particular bank to proceed ahead of a write request that is already bound for, and/or in-progress on that bank. Memory controller 118 may allow the read request to proceed before the write request by suspending the write request and marking the write request as suspended in write tracking buffer 110.

However, write tracking buffer 110 may store a limited number of entries. If the write tracking buffer is full, no more write requests may proceed. If too many write requests are suspended in favor of read requests, write tracking buffer 110 may fill and remain full, and memory controller 118 may not be able to issue subsequent writes to memory 106. Additionally, increasing the size of the write tracking buffer would increase the power consumption and logical complexity of memory controller 118.

As described herein, memory controller 118 determines whether to allow write requests to be suspended, or to disallow suspension of write requests so that entries in the write tracking buffer can be freed. Allowing memory controller 118 to suspend write requests may improve the performance of memory 106 by allowing lower latency read requests to proceed ahead of slower latency write requests. Trading off write suspension reduces the size of write tracking buffer 118, which may reduce logical complexity and power consumption, while still allowing suspension of write requests.

In the example of FIG. 1, memory controller 118 determines a memory access pattern. The access pattern indicates that memory 106 is utilizing a high write bandwidth or a low write bandwidth. Based on the determined memory access pattern memory controller 118 may execute the write request bound for memory 106. More particularly, executing the write request based on the memory access pattern may comprise marking writes for a bank of memory 106 as "un-suspendable," or as suspendable. Suspendable writes may be preempted by a read request bound for the same bank as a write request. If a bank is marked as un-suspendable, writes for that bank may not be preempted by a write.

Thus, FIG. 1 illustrates an example system comprising memory controller 118 to receive a write request 102 bound for memory 106. Memory controller 118 may store an entry 104 associated with write request 102 in write tracking buffer 110. Memory controller 118 may determine an access pattern of the memory indicating a high or a low write bandwidth of the memory. Memory controller 118 may execute the write request bound for the memory based on the determined memory access pattern. Memory controller 118 may complete execution of the write request, and responsive to completing execution of the write request, free the entry associated with the write request from the write tracking buffer.

Figure 2:
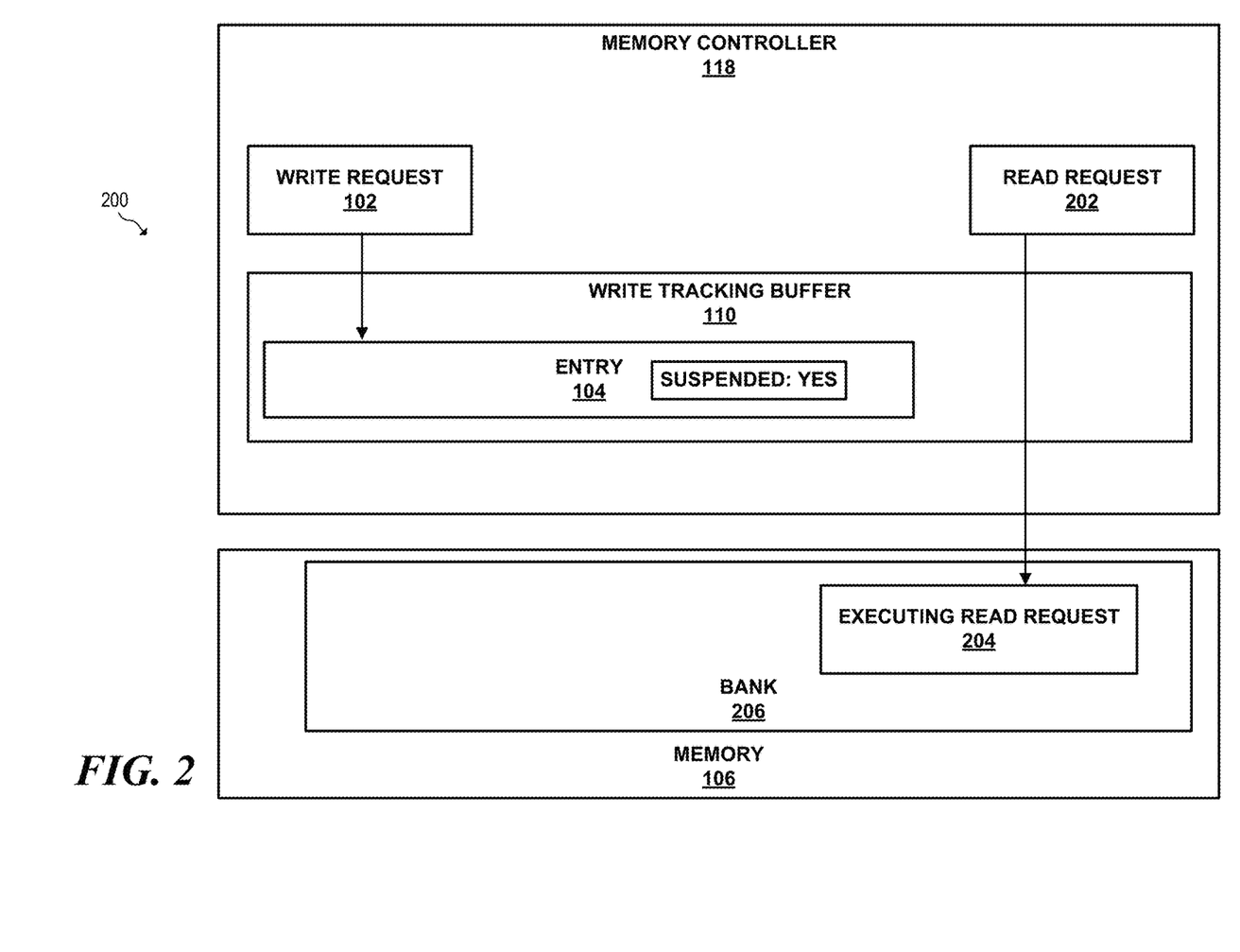
FIG. 2 is another conceptual diagram of an example computing system that may perform write tracking.

FIG. 2 is another conceptual diagram of an example computing system that may perform write tracking. FIG. 2 illustrates a computing system 200. In various examples, computing system 200 may be similar to system 100 (FIG. 1).

In the example of FIG. 2, memory 106 comprises a bank 206. Although a single bank is illustrated for the purpose of example, memory 106 may comprise multiple banks. Each bank of memory 106 may comprise multiple different addressable memory locations. Each bank may be an independently accessible unit within memory 106. Memory 106 may access different addresses of each separate bank in parallel. For example, memory 106 may execute, in parallel, a read operation at a first address of a first bank, and write data to a second, different address of a different bank of memory 106.

In the example of FIG. 2, memory controller 118 receives a write request 102, and stores an entry 104 associated with write request 102 in write tracking buffer 110. Entry 104 may comprise data that indicate the execution progress of write request 102 and/or whether a bank associated with write request 102 has been suspended. In this example, memory controller 118 may cause memory 106 to begin execution of write request 102. Memory controller 118 also receives a read request 202. Read request 202 is bound for a same bank 206 as write request 102.

In the example of FIG. 2, memory controller 118 determines that memory 106 has a low current write bandwidth. Based on the determined memory access pattern, memory controller 118 suspends write request 102. To indicate that write request 102 is suspended, memory controller 118 may store a value (e.g. a bit or other value) in entry 104 indicating that write request 102 is suspended. Memory controller 118 then executes read request 202, which is bound for bank 206. Memory controller 118 allows executing read request 204 to complete before allowing write request 102 to complete execution.

In various examples, memory controller 118 may determine a memory access pattern based on a number of entries stored in write tracking buffer 110. For example, if there are many entries stored in write tracking buffer 110 and/or write tracking buffer 110 is close to being full (e.g. 90 percent full), memory controller 118 may determine that memory 106 is using a high write bandwidth. If the number of write entries stored in write tracking buffer 110 is low (e.g. 10 percent full), memory controller 118 may determine that memory 106 uses a low write bandwidth. It should be understood that the fullness values are for the purpose of example. Memory controller 118 may determine a high or low write bandwidth based on a range of values or values other than the 10 percent and 90 percent fullness values described above.

In various examples, memory controller 118 may determine a high write bandwidth and a low bandwidth based on a range of fullness or emptiness values of write tracking buffer 110. In various examples, memory controller 118 may determine a high or low write bandwidth based on a number of write or read requests bound for memory 106, as some non-limiting examples.

In various examples, memory controller 118 may determine a level of write suspension aggressiveness based on the determined memory access pattern. More particularly, memory controller 118 may determine, based on the writes suspension aggressiveness, whether to: disallow suspension of a write request, allow suspension of a write request, or disallow suspension of a write request if the write request will complete in a threshold amount of time.

As an example of these write aggressiveness behaviors, if memory controller 118 determines a low level of suspension aggressiveness, memory controller 118 may disallow suspension of write requests for a bank. Responsive to disallowing write suspension, memory controller 118 may free an entry associated with a write request associated with the un-suspendable bank from write tracking buffer 104. Memory controller 118 may free the entry from write tracking buffer 104 because once a bank is marked as un-suspendable, any pending write requests for that bank are guaranteed to complete execution before a conflicting read operation 202 would be executed.

As another example, memory controller 118 may determine that a write request will complete in a threshold period of time. Upon completion of the write request, the entry associated with the write request can be freed. Thus, memory controller 118 may mark a bank as un-suspendable when the write will complete within the threshold period of time in order to free entries that will complete within that threshold period. Memory controller 118 may adjust the threshold based e.g. on write bandwidth of memory 104, to free more entries or fewer entries from write tracking buffer 104.

As yet another example, memory controller 118 may determine whether to allow write suspension based on the determined level of suspension aggressiveness, e.g. a determined high level of suspension aggressiveness. Memory controller 118 may determine to allow write suspension if write bandwidth to write tracking buffer 104 is low. If write suspension is enabled, memory controller 118 may suspend a write request pending for a bank.

Figure 3:
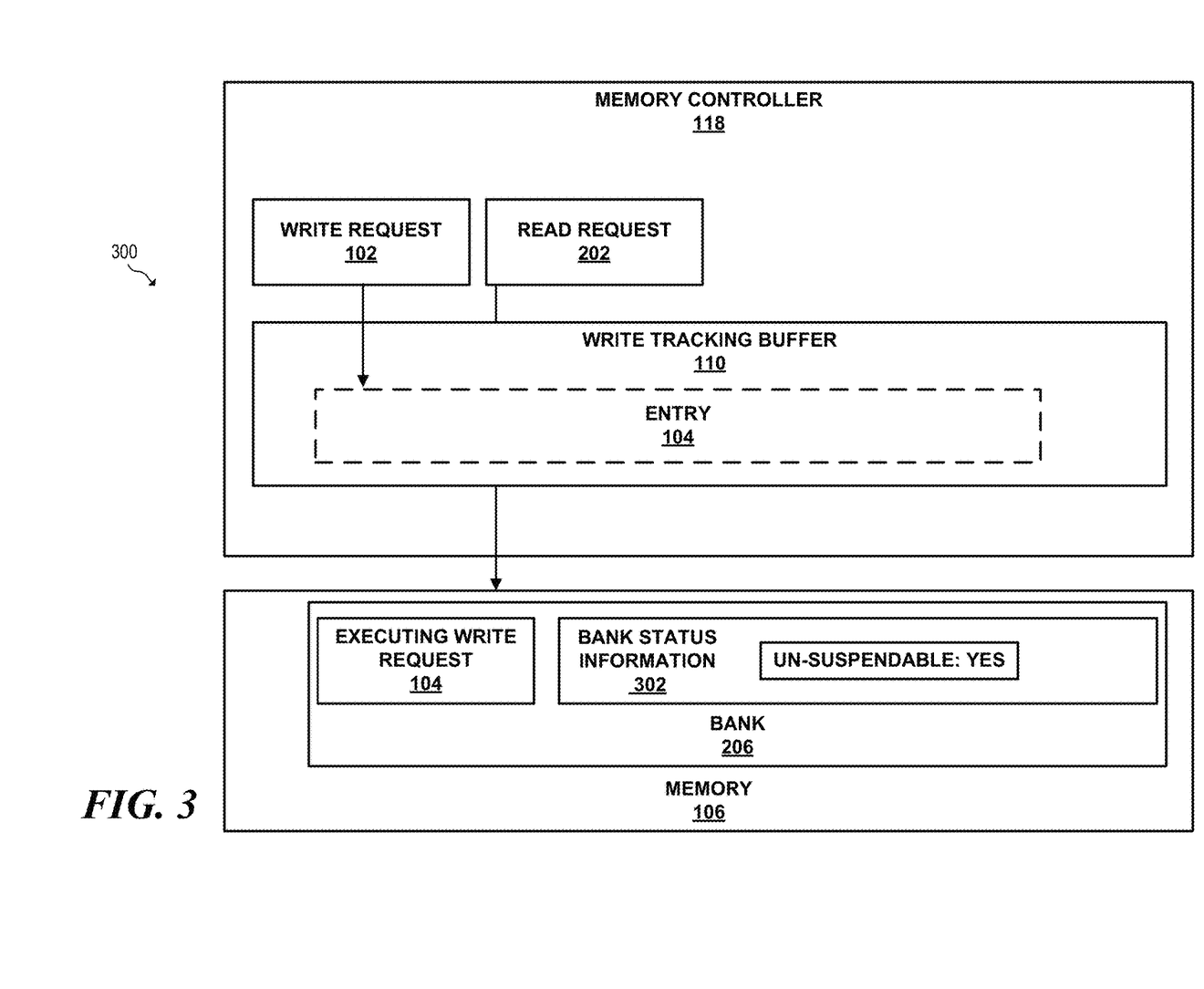
FIG. 3 is another conceptual diagram of an example computing system that may perform write tracking.

FIG. 3 is another conceptual diagram of an example computing system that may perform write tracking. FIG. 3 illustrates a computing system 300. In various examples, computing system 300 may be similar to system 100 (FIG. 1).

In the example of FIG. 3, memory 106 comprises a bank 206. Although a single bank is illustrated for the purpose of example, memory 106 may comprise multiple banks. Each bank of memory 106 may comprise multiple different addressable memory locations. Each bank may be an independently accessible unit within memory 106. Memory 106 may access different addresses of each separate bank in parallel.

In the example of FIG. 3, memory controller 118 has received write request 102, and stored an associated entry 104 in write tracking buffer 104. Memory controller 118 has also received a read request 202. Read request 202 is bound for a same bank 206 as write request 102.

Memory controller 118 may determine that there is a high memory access pattern associated with memory 106. That is, memory controller 118 may determine that there are many writes bound or memory 106. In some examples, memory controller 118 may determine the access pattern based on a number of entries stored in write tracking buffer 110. For example, if there are many entries stored in write tracking buffer 110 or write tracking buffer 110 is close to being full of entries (e.g. 90 percent full as a non-limiting example), memory controller 118 may determine that memory 106 is using a high write bandwidth.

Based on the determination that there is a high memory access pattern associated with memory 106, memory controller 118 marks bank 206 as un-suspendable. Memory controller 118 marks bank 206 as un-suspendable by setting a value (e.g. a bit flag or the like) in bank status information 302, which is associated with bank 206.

Responsive to marking a bank as un-suspendable, memory controller 118 frees entry 104 from write tracking buffer 110 because executing write request 104 will complete before any other operations can issue to bank 206, and therefore write request 104 no longer needs to be tracked. Memory controller 118 allows executing write request 104 to complete before allowing read request 202 to execute.

Figure 4:
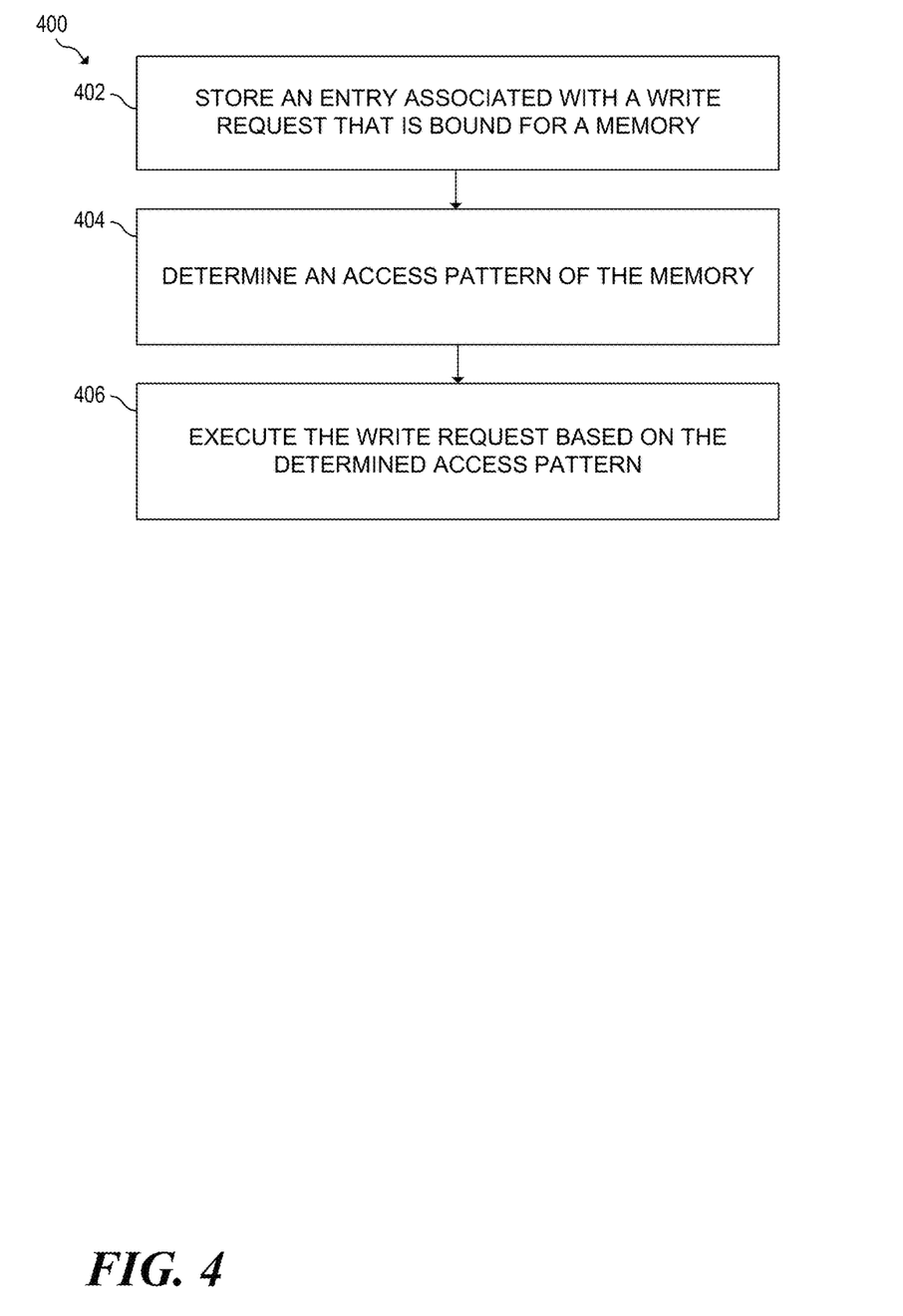
FIG. 4 is a flowchart of an example method for performing write tracking.

FIG. 4 is a flowchart of an example method for performing write tracking. FIG. 4 illustrates method 400. Method 400 may be described below as being executed or performed by a system, for example, computing system 100 (FIG. 1), computing system 200 (FIG. 2), computing system 300 (FIG. 3).

In various examples, method 400 may be performed by hardware, software, firmware, or any combination thereof. Other suitable systems and/or computing devices may be used as well. Method 400 may be implemented in the form of executable instructions stored on at least one machine-readable storage medium of the system and executed by at least one processor of the system. Alternatively or in addition, method 400 may be implemented in the form of electronic circuitry (e.g., hardware). In alternate examples of the present disclosure, one or more blocks of method 400 may be executed substantially concurrently or in a different order than shown in FIG. 4. In alternate examples of the present disclosure, method 400 may include more or fewer blocks than are shown in FIG. 4. In some examples, one or more of the blocks of method 400 may, at certain times, be ongoing and/or may repeat.

Method 400 may start at block 402 at which point memory controller 118 and/or memory 106 may store, in a write tracking buffer (e.g. write tracking buffer 110), an entry (e.g. entry 104) associated with a write request (e.g. write request 102) that is bound for a memory (e.g. memory 106).

At block 404, memory controller 118 may determine an access pattern of the memory. The access pattern may indicate a high or a low write bandwidth of the memory. At block 406, memory controller 118 may cause memory 106 to execute the write request based on the determined access pattern.

Figure 5:
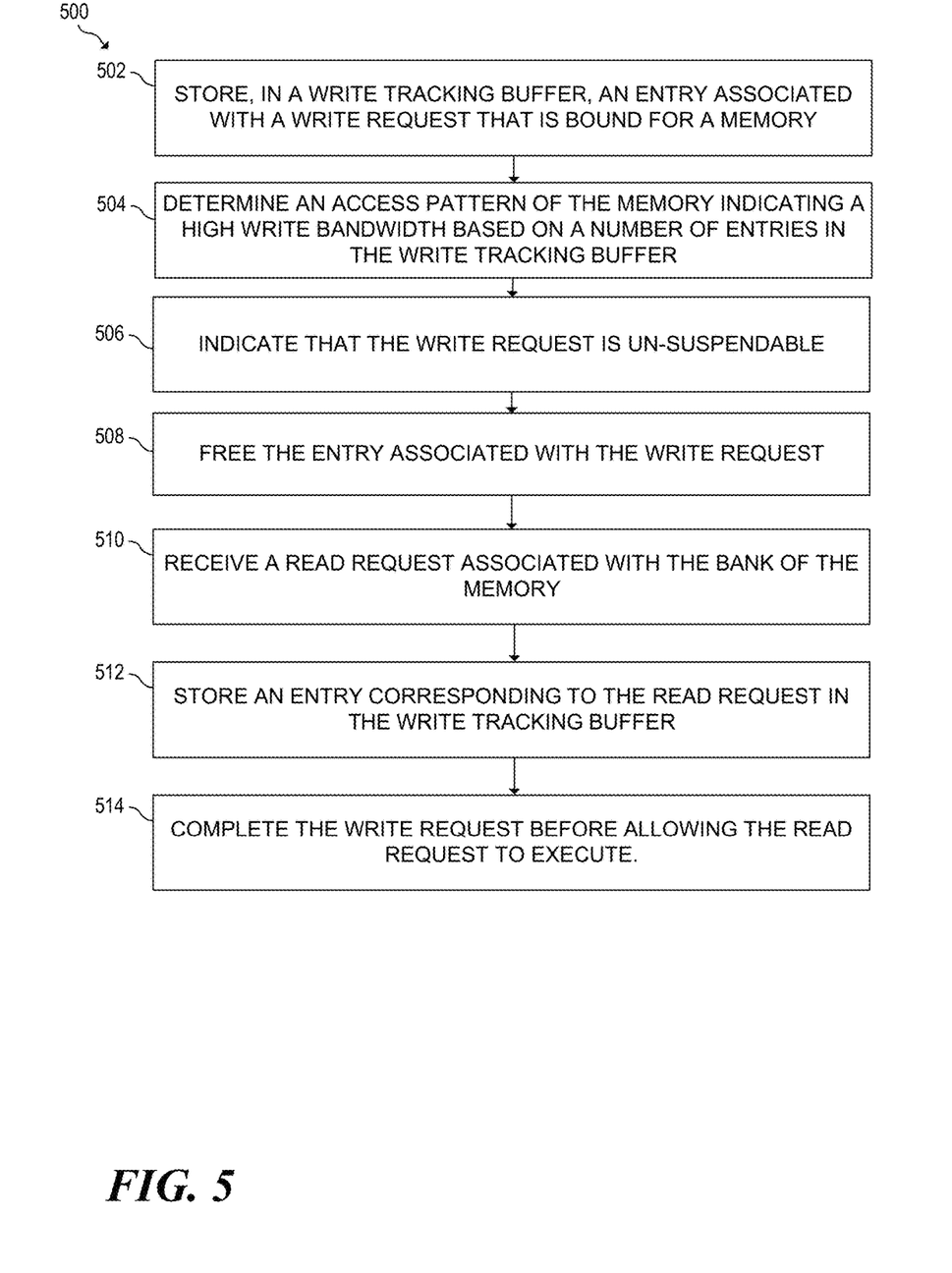
FIG. 5 is a flowchart of an example method for performing write tracking.

FIG. 5 is a flowchart of an example method for performing write tracking. FIG. 5 illustrates method 500. Method 500 may be described below as being executed or performed by a system, for example, computing system 100 (FIG. 1), computing system 200 (FIG. 2), or computing system 300 (FIG. 3). Other suitable systems and/or computing devices may be used as well. Method 500 may be implemented in the form of executable instructions stored on at least one machine-readable storage medium of the system and executed by at least one processor of the system. Method 500 may be performed by hardware, software, firmware, or any combination thereof.

Alternatively or in addition, method 500 may be implemented in the form of electronic circuitry (e.g., hardware). In alternate examples of the present disclosure, one or more blocks of method 500 may be executed substantially concurrently or in a different order than shown in FIG. 5. In alternate examples of the present disclosure, method 500 may include more or fewer blocks than are shown in FIG. 5. In some examples, one or more of the blocks of method 500 may, at certain times, be ongoing and/or may repeat.

In various examples, method 500 may start at block 502 at which point memory controller 118 may store, in a write tracking buffer (e.g. write tracking buffer 110), an entry (e.g. entry 104) associated with a write request (e.g. write request 102) that is bound for a memory (e.g. memory 106).

At block 504, memory controller 118 may determine an access pattern for the memory, wherein the access pattern indicates a high write bandwidth of the memory. In various examples, memory controller 118 may determine the memory access pattern based on a number of entries in the write tracking buffer. At block 506, responsive to determining that the access pattern indicates a high write bandwidth of the memory, memory controller 118 may indicate that the write request is un-suspendable. At block 510, memory controller 118 may free the entry associated with the write request from the write tracking buffer.

At block 510, memory controller 118 may receive a read request (e.g. read request 202) associated a same bank (e.g. bank 206) of the memory as the executing write request. In various examples at block 512, memory controller 118 may store an entry corresponding to the read request in the write tracking buffer. At block 514, memory controller 118 may cause memory 106 to complete executing the write request before allowing the read request to execute.

Figure 6:
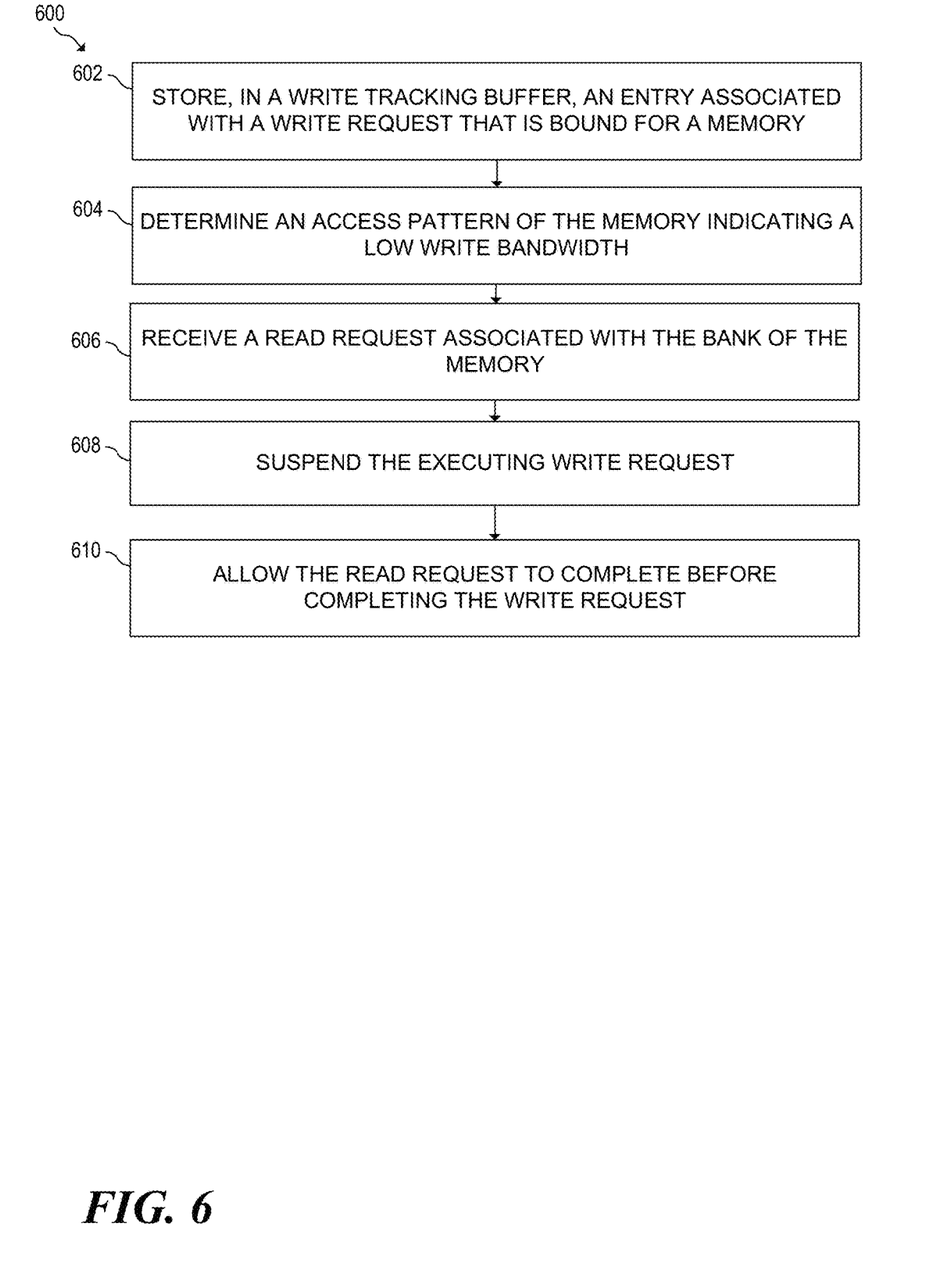
FIG. 6 is a flowchart of an example method for performing write tracking.

FIG. 6 is a flowchart of an example method for performing write tracking. FIG. 6 illustrates method 600. Method 600 may be described below as being executed or performed by a system, for example, computing system 100 (FIG. 1), computing system 200 (FIG. 2), or computing system 300 (FIG. 3). Other suitable systems and/or computing devices may be used as well. Method 600 may be implemented in the form of executable instructions stored on at least one machine-readable storage medium of the system and executed by at least one processor of the system. Method 600 may be performed by hardware, software, firmware, or any combination thereof.

Alternatively or in addition, method 600 may be implemented in the form of electronic circuitry (e.g., hardware). In alternate examples of the present disclosure, one or more blocks of method 600 may be executed substantially concurrently or in a different order than shown in FIG. 6. In alternate examples of the present disclosure, method 600 may include more or fewer blocks than are shown in FIG. 6. In some examples, one or more of the blocks of method 600 may, at certain times, be ongoing and/or may repeat.

In various examples, method 600 may start at block 602 at which point memory controller 118 may store, in a write tracking buffer (e.g. write tracking buffer 110), an entry (e.g. entry 104) associated with a write request (e.g. write request 102) that is bound for a memory (e.g. memory 106).

At block 604, memory controller 118 may determine an access pattern for the memory, wherein the access pattern indicates a low write bandwidth of the memory. In various examples, memory controller 118 may determine the memory access pattern based on a number of entries in the write tracking buffer. For example, if the number of entries is high, or if the write tracking buffer is relatively full (e.g. 90 percent full as a non-limiting example), memory controller 118 may determine a high write bandwidth. At block 606, memory controller 118 may receive a read request (e.g. read request 202) associated with a same bank (e.g. bank 206) of the memory as the executing write request At block 608, responsive to determining that the access pattern indicates a low write bandwidth of the memory, memory controller 118 may suspend the executing write request. At block 610, memory controller 118 may allow the read request to complete before completing the write request.

Figure 7:
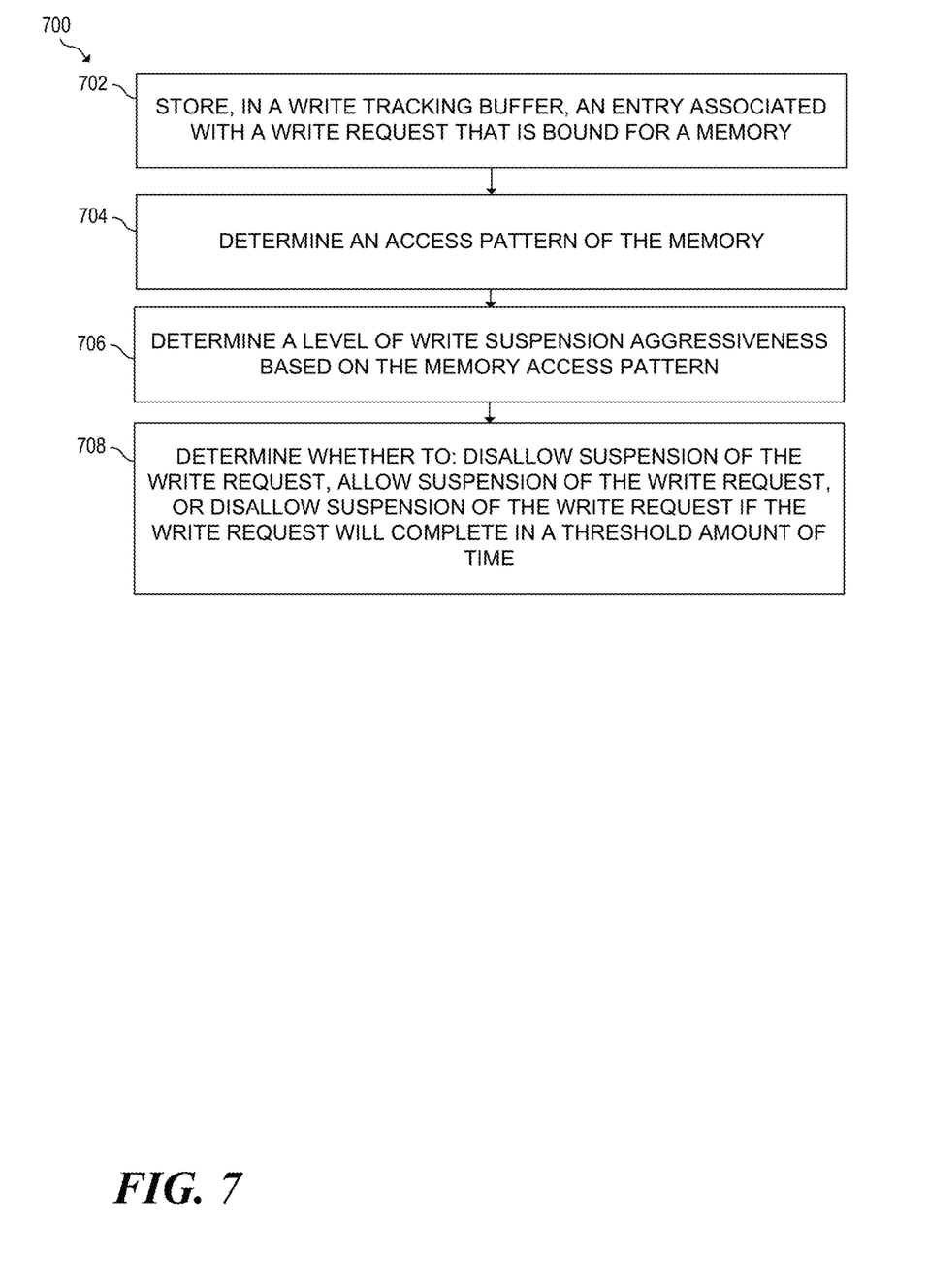
FIG. 7 is a flowchart of an example method for performing write tracking.

FIG. 7 is a flowchart of an example method for performing write tracking. FIG. 7 illustrates method 700. Method 700 may be described below as being executed or performed by a system, for example, computing system 100 (FIG. 1), computing system 200 (FIG. 2), computing system 300 (FIG. 3).

In various examples, method 700 may be performed by hardware, software, firmware, or any combination thereof. Other suitable systems and/or computing devices may be used as well. Method 700 may be implemented in the form of executable instructions stored on at least one machine-readable storage medium of the system and executed by at least one processor of the system. Alternatively or in addition, method 700 may be implemented in the form of electronic circuitry (e.g., hardware). In alternate examples of the present disclosure, one or more blocks of method 700 may be executed substantially concurrently or in a different order than shown in FIG. 7. In alternate examples of the present disclosure, method 700 may include more or fewer blocks than are shown in FIG. 7. In some examples, one or more of the blocks of method 700 may, at certain times, be ongoing and/or may repeat.

Method 700 may start at block 702 at which point memory controller 118 and/or memory 106 may store, in a write tracking buffer (e.g. write tracking buffer 110), an entry (e.g. entry 108) associated with a write request (e.g. write request 102) that is bound for a memory (e.g. memory 106).

At block 706, memory controller 118 may determine an access pattern of the memory. The access pattern may indicate a high or a low write bandwidth of the memory. At block 706, memory controller 118 may determine a level of write suspension aggressiveness based on the memory access pattern.

At bock 708, memory controller 118 may determine, based on the write suspension aggressiveness, whether to: disallow suspension of the write request, allow suspension of the write request, or disallow suspension of the write request if the write request will complete in a threshold amount of time.

Figure 8:
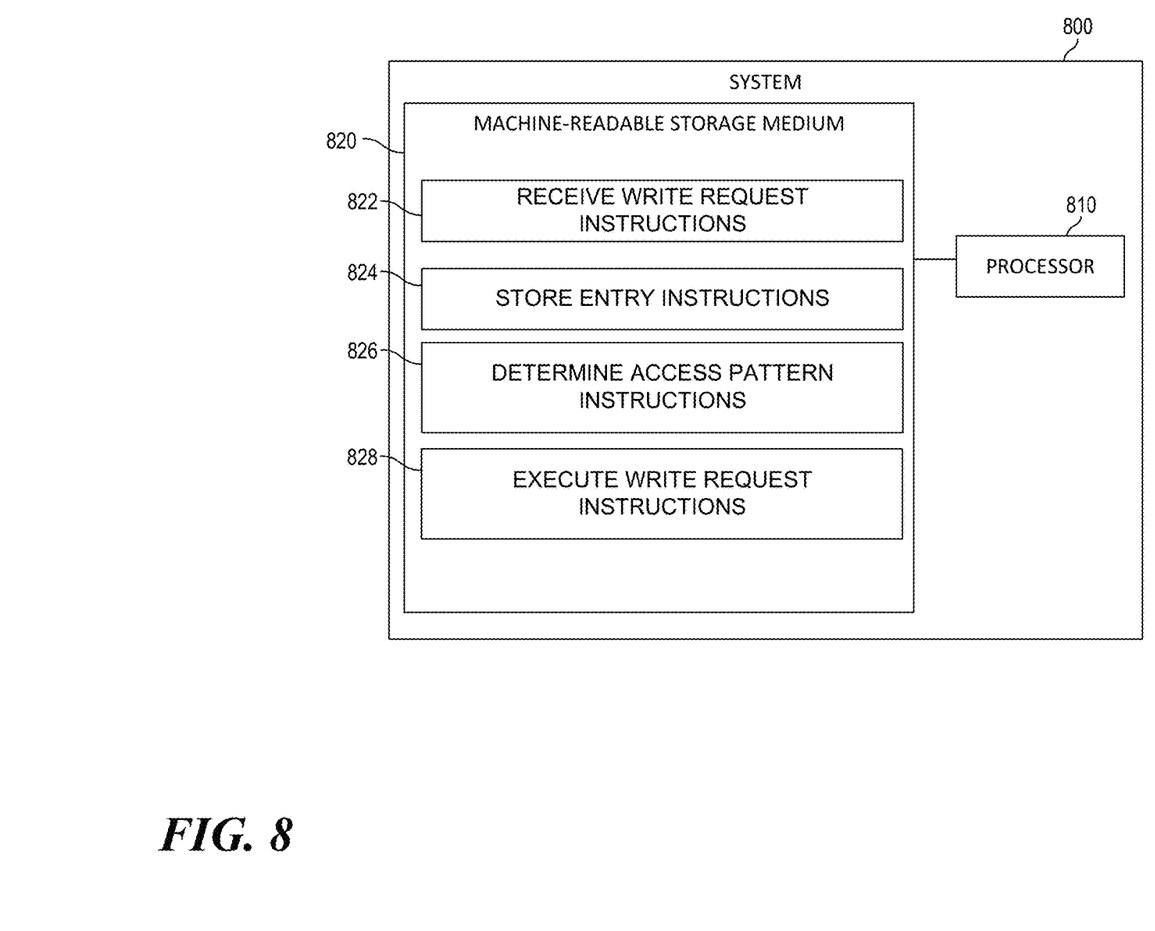
FIG. 8 is a block diagram of an example system for performing write tracking.

FIG. 8 is a block diagram of an example system for performing write tracking. In the example of FIG. 8, system 800 includes a processor 810 and a machine-readable storage medium 820. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 810 may be one or more central processing units (CPUs), microprocessors, and/or other hardware devices suitable for retrieval and execution of instructions stored in machine-readable storage medium 820. In the particular example shown in FIG. 8, processor 810 may fetch, decode, and execute instructions 822, 824, 826, 828 to perform write tracking. As an alternative or in addition to retrieving and executing instructions, processor 810 may include one or more electronic circuits comprising a number of electronic components for performing the functionality of one or more of the instructions in machine-readable storage medium 820. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Machine-readable storage medium 820 may be any electronic, magnetic, optical, or other physical storage device that stores executable instructions. Thus, machine-readable storage medium 820 may be, for example, Random Access Memory (RAM), an Electrically-Erasable Programmable Read-Only Memory (EEPROM), a storage drive, an optical disc, and the like. Machine-readable storage medium 820 may be disposed within system 800, as shown in FIG. 8. In this situation, the executable instructions may be "installed" on the system 800. Alternatively, machine-readable storage medium 820 may be a portable, external or remote storage medium, for example, that allows system 800 to download the instructions from the portable/external/remote storage medium. As described herein, machine-readable storage medium 820 may be encoded with executable instructions for performing write tracking.

Referring to FIG. 8, receive write request instructions 822, when executed by a processor (e.g., 810), may cause system 800 to receive a write request (e.g. write request 102) bound for a memory (e.g. memory 106).

At block 824, store entry instructions, when executed, may cause processor 810 to store an entry (e.g. entry 104) associated with the write request in a write tracking buffer (e.g. write tracking buffer 110). At block 826, determine access pattern instructions, when executed, may cause processor 810 to determine, based on a number of entries stored in the write tracking buffer, an access pattern of the memory, wherein the access pattern indicates a high or a low write bandwidth of the memory. At block 828, execute write instructions, when executed, may cause processor 810 to execute the write request bound for the memory based on the determined memory access pattern.

Figure 9:
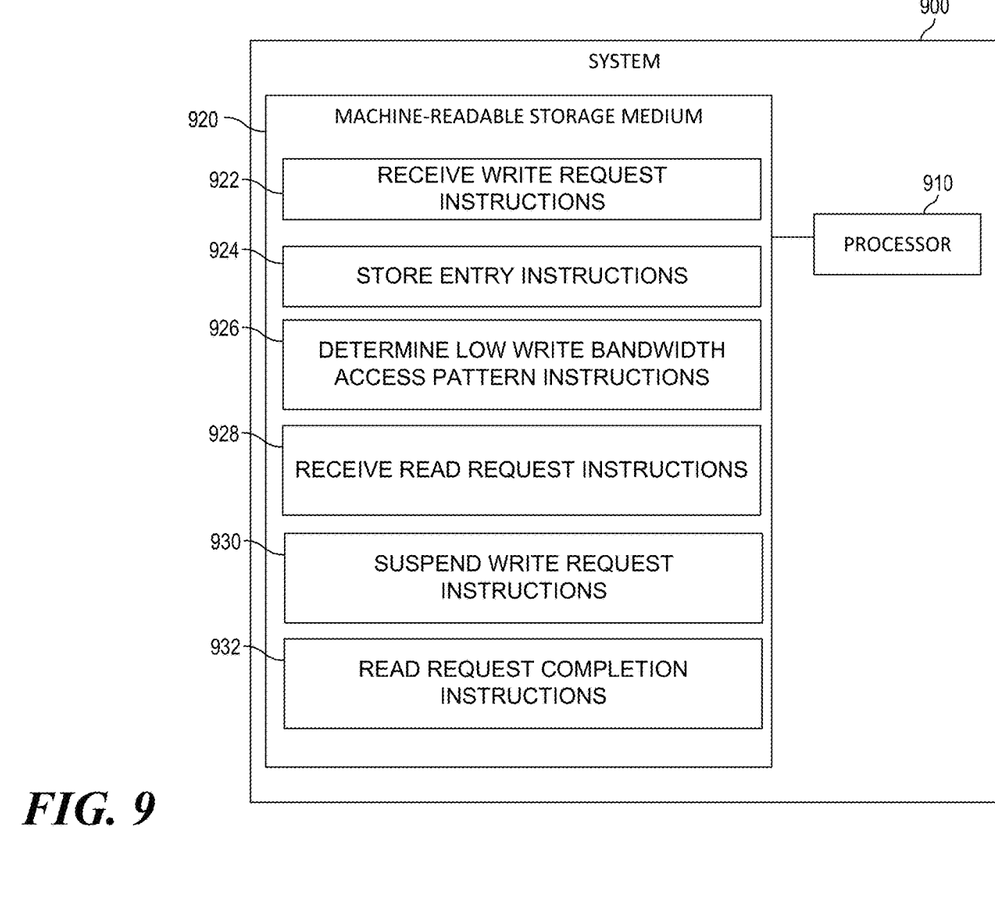
FIG. 9 is a block diagram of an example system for performing write tracking.

FIG. 9 is a block diagram of an example system for performing write tracking. In the example of FIG. 9, system 900 includes a processor 910 and a machine-readable storage medium 920. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 910 may be one or more central processing units (CPUs), microprocessors, and/or other hardware devices suitable for retrieval and execution of instructions stored in machine-readable storage medium 920. In the particular example shown in FIG. 9, processor 910 may fetch, decode, and execute instructions 922, 924, 926, 928, 930, 932, to perform write tracking. As an alternative or in addition to retrieving and executing instructions, processor 910 may include one or more electronic circuits comprising a number of electronic components for performing the functionality of one or more of the instructions in machine-readable storage medium 920. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Machine-readable storage medium 920 may be any electronic, magnetic, optical, or other physical storage device that stores executable instructions. Thus, machine-readable storage medium 920 may be, for example, Random Access Memory (RAM), an Electrically-Erasable Programmable Read-Only Memory (EEPROM), a storage drive, an optical disc, and the like. Machine-readable storage medium 920 may be disposed within system 900, as shown in FIG. 9. In this situation, the executable instructions may be "installed" on the system 900. Alternatively, machine-readable storage medium 920 may be a portable, external or remote storage medium, for example, that allows system 900 to download the instructions from the portable/external/remote storage medium. As described herein, machine-readable storage medium 920 may be encoded with executable instructions for performing write tracking.

Referring to FIG. 9, receive write request instructions 922, when executed by a processor (e.g., 910), may cause system 900 to receive a write request (e.g. write request 102) bound for a memory (e.g. memory 106).

At block 924 store entry instructions, when executed, may cause processor 910 to store an entry (e.g. entry 104) associated with the write request in a write tracking buffer (e.g. write tracking buffer 110). At block 926, determine low write bandwidth access pattern instructions, when executed, may cause processor 910 to determine, based on a number of entries stored in the write tracking buffer, an access pattern of the memory indicating low write bandwidth of the memory. At block 928, receive read request instructions, when executed, may cause processor 910 to receive a read request (e.g. read request 202) associated with a same bank (e.g. bank 206) of the memory as the executing write request.

At block 930, suspend write request instructions, when executed, may cause processor 910 to suspend the executing write request. At block 932, read request completion instructions, when executed, may cause processor 910 to allow the read request to complete before completing the write request.

Figure 10:
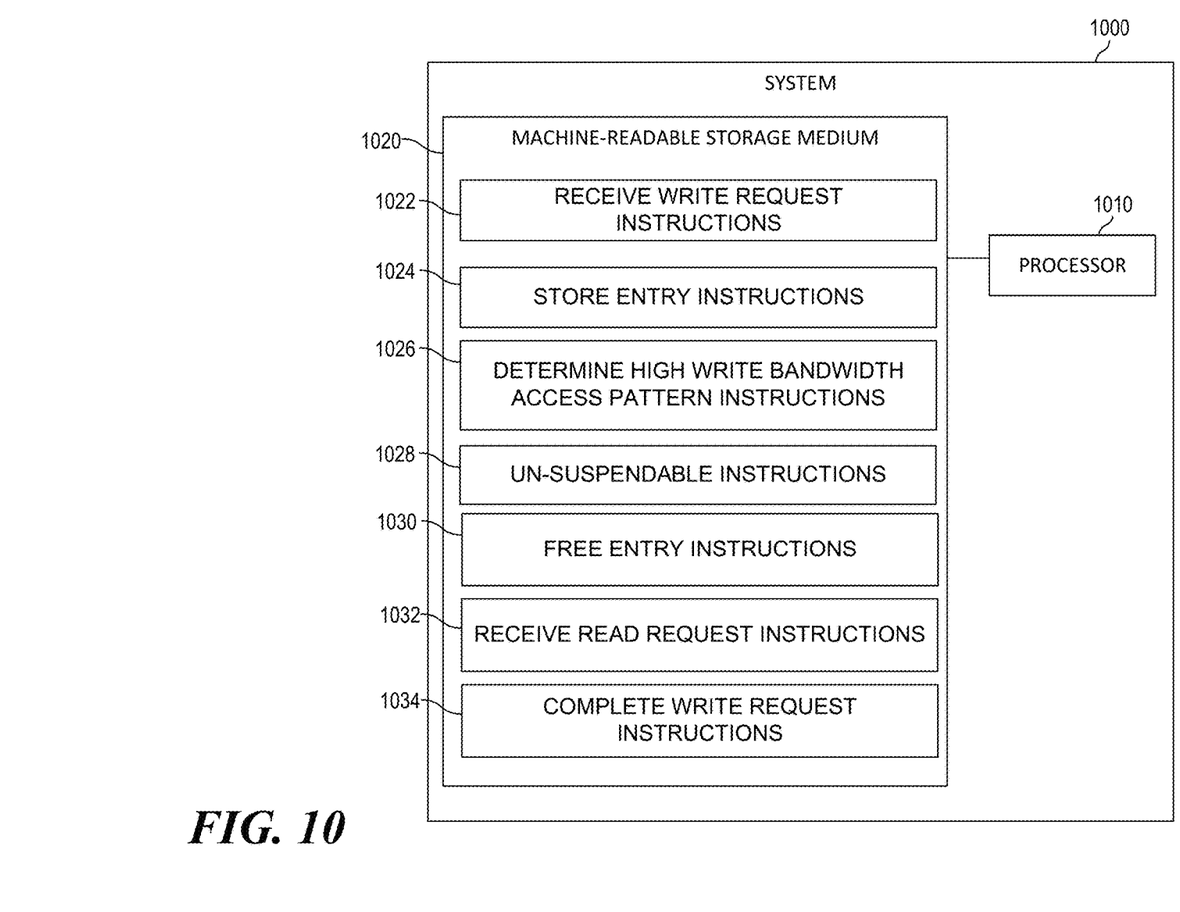
FIG. 10 is a block diagram of an example system for performing write tracking.

FIG. 10 is a block diagram of an example system for performing write tracking. In the example of FIG. 10, system 1000 includes a processor 1010 and a machine-readable storage medium 1020. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 1010 may be one or more central processing units (CPUs), microprocessors, and/or other hardware devices suitable for retrieval and execution of instructions stored in machine-readable storage medium 1020. In the particular example shown in FIG. 10, processor 1010 may fetch, decode, and execute instructions 1022, 1024, 1026, 1028, 1030, 1032, 1014, to perform write tracking. As an alternative or in addition to retrieving and executing instructions, processor 1010 may include one or more electronic circuits comprising a number of electronic components for performing the functionality of one or more of the instructions in machine-readable storage medium 1020. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Machine-readable storage medium 1020 may be any electronic, magnetic, optical, or other physical storage device that stores executable instructions. Thus, machine-readable storage medium 1020 may be, for example, Random Access Memory (RAM), an Electrically-Erasable Programmable Read-Only Memory (EEPROM), a storage drive, an optical disc, and the like. Machine-readable storage medium 1020 may be disposed within system 1000, as shown in FIG. 10. In this situation, the executable instructions may be "installed" on the system 1000. Alternatively, machine-readable storage medium 1020 may be a portable, external or remote storage medium, for example, that allows system 1000 to download the instructions from the portable/external/remote storage medium. As described herein, machine-readable storage medium 1020 may be encoded with executable instructions for tracking writes.

Referring to FIG. 10, receive write request instructions 1022, when executed by a processor (e.g., 1010), may cause system 1000 to receive a write request (e.g. write request 102) bound for a memory (e.g. memory 106).

At block 1024 store entry instructions, when executed, may cause processor 1010 to store an entry (e.g. entry 104) associated with the write request in a write tracking buffer (e.g. write tracking buffer 110). At block 1026, determine high write bandwidth access pattern instructions 1026, when executed, may cause processor 1010 to determine, based on a number of entries stored in the write tracking buffer, an access pattern of the memory indicating a high write bandwidth of the memory. At block 1028, un-suspendable instructions may cause processor 1010 to indicate that the write request is un-suspendable.

At block 1030, free entry instructions, when executed, may cause processor 1010 to free, from the write tracking buffer, the entry associated with the write request. At block 1032, receive read request instructions, when executed, may cause processor 1010 to receive a read request (e.g. read request 202) associated with a same bank (e.g. bank 206) of the memory as the executing write request. At block 1034, complete write request instructions, when executed, may cause processor 1010 to complete the write request before allowing the read request to execute.

The invention claimed is:

1. A method comprising:
    storing, in a write tracking buffer, an entry associated with a write request that is bound for a memory, the entry indicating progress of completion of the write request;
    determining an access pattern of the memory, wherein the access pattern indicates a high or a low write bandwidth of the memory based on how full the write tracking buffer is;
    responsive to determining that the access pattern indicates the low write bandwidth, allowing write suspension to a bank of the memory with which the write request is associated;
    determining that the write request will complete within a threshold length of time;
    in response to determining that the write request will complete within the threshold length of time, disallowing the write suspension to the bank of the memory and executing the write request;
        while execution of the write request is in-progress, receiving a read request associated with the bank of memory;
        responsively suspending the write request that the execution of which is in-progress if the access pattern indicates the low write bandwidth;
        allowing the read request to complete; and
        after completion of the read request, resuming the execution of the write request; and
    completing the write request.

2. The method of claim 1 comprising:
    storing, in the write tracking buffer, an entry corresponding to the read request.

3. The method of claim 1 comprising:
    determining a level of write suspension aggressiveness based on the memory access pattern; and
    determining, based on the write suspension aggressiveness, whether to: disallow suspension of the write request, allow suspension of the write request, or disallow suspension of the write request if the write request will complete in a threshold amount of time.

4. The method of claim 1, comprising:
    determining the access pattern based on a number of entries stored in the write tracking buffer.

5. The method of claim 1 comprising:
    responsive to determining that the access pattern indicates the high write bandwidth:
        indicating that the write request is un-suspendable;
        freeing, from the write tracking buffer, the entry associated with the write request;
        receiving a read request associated with a bank of memory; and
        completing the write request before allowing the read request to execute.

6. A system comprising:
    a memory;
    a memory controller comprising a write tracking buffer, the memory controller to:
        receive a write request bound for the memory;
        store an entry associated with the write request in the write tracking buffer, the entry indicating progress of completion of the write request;
        determine an access pattern of the memory, wherein the access pattern indicates a high or a low write bandwidth of the memory based on how full the write tracking buffer is;
        responsive to determining that the access pattern indicates the low write bandwidth, allow write suspension to a bank of the memory with which the write request is associated;
        determine that the write request will complete within a threshold length of time;
        in response to determining that the write request will complete within the threshold length of time, disallow the write suspension to the bank of the memory and execute the write request;
            while execution of the write request is in-progress, receive a read request associated with the bank of memory;
            responsively suspend the write request that the execution of which is in-progress if the access pattern indicates the low write bandwidth;
            allow the read request to complete;
            after completion of the read request, resume the execution of the write request; and
        completing the write request.

7. The system of claim 6, the memory controller to:
    determine a level of write suspension aggressiveness based on the memory access pattern; and
    determine, based on the writes suspension aggressiveness, whether to: disallow suspension of the write request, allow suspension of the write request, or disallow suspension of the write request if the write request will complete in a threshold amount of time.

8. The system of claim 6, the memory controller to:
    responsive to determining that the memory access pattern uses the high write bandwidth
        indicate, in bank status information associated with a same bank of memory as the write, that the write is un-suspendable;
        free, from the write tracking buffer, the entry associated with the write;
        receive a read request associated with the same bank of the memory as the write request; and
        complete the write request before allowing the read request to execute.

9. The system of claim 6,
    wherein to determine the memory access pattern, the memory controller to:
    determine the memory access pattern based on a number of entries stored in the write tracking buffer.

10. A non-transitory machine-readable storage medium encoded with instructions, the instructions that, when executed, cause a processor to:
    receive a write request bound for a memory;
    store an entry associated with the write request in a write tracking buffer, the entry indicating progress of completion of the write request;

determine, based on a number of entries stored in the write tracking buffer, an access pattern of the memory, wherein the access pattern indicates a high or a low write bandwidth of the memory;

responsive to determining that the access pattern indicates the low write bandwidth, allow write suspension to a bank of the memory with which the write request is associated;

determine that the write request will complete within a threshold length of time;

in response to determining that the write request will complete within the threshold length of time, disallow the write suspension to the bank of the memory and execute the write request;

while execution of the write request is in-progress, receive a read request associated with the bank of memory;

responsively suspend the write request that the execution of which is in-progress if the access pattern indicates the low write bandwidth;

allow the read request to complete; and after completion of the read request, resume the execution of the write request; and complete the write request.

11. The non-transitory computer-readable storage medium of claim 10 comprising instructions that, when executed, cause the processor to:

responsive to determining that the access pattern indicates high write bandwidth:

indicate that the write request is un-suspendable;

free, from the write tracking buffer, the entry associated with the write request;

receive a read request associated with a bank of memory; and complete the write request before allowing the read request to execute.

* * * * *